United States Patent
Tanuma

[19]

[11] Patent Number: 6,129,412
[45] Date of Patent: Oct. 10, 2000

[54] FLOOR STRUCTURE OF VEHICLE BODY

[75] Inventor: Kinichi Tanuma, Kanagawa-ken, Japan

[73] Assignee: Nissan Motor Co., Ltd., Kanagawa-Ken, Japan

[21] Appl. No.: 09/285,723

[22] Filed: Apr. 5, 1999

[30]   Foreign Application Priority Data

Apr. 8, 1998  [JP]  Japan ................................. 10-095938

[51] Int. Cl.[7] ...................................................... B60N 2/04
[52] U.S. Cl. ...................................... 296/204; 296/65.02
[58] Field of Search ............................. 296/188, 203.01, 296/204, 209, 187, 65.02, 65.03, 65.13

[56]             References Cited

U.S. PATENT DOCUMENTS

| | | | |
|---|---|---|---|
| 5,104,176 | 4/1992 | Mrozowski | 296/187 |
| 5,127,704 | 7/1992 | Komatsu | 296/204 |
| 5,352,011 | 10/1994 | Kihara et al. | 296/203.01 |
| 5,388,885 | 2/1995 | Warren | 296/203.01 |
| 5,584,525 | 12/1996 | Nakano et al. | 296/68.1 |
| 5,613,727 | 3/1997 | Yamazaki | 296/188 |
| 5,820,204 | 10/1998 | Masuda et al. | 296/188 |
| 5,921,618 | 7/1999 | Mori et al. | 286/188 |
| 5,954,390 | 9/1999 | Kleinhoffer et al. | 296/203.01 |
| 6,007,145 | 12/1999 | Tezuka | 296/204 |

FOREIGN PATENT DOCUMENTS 5-28790  4/1993  Japan .

*Primary Examiner*—D. Glenn Dayoan
*Assistant Examiner*—Paul Chenevert
*Attorney, Agent, or Firm*—McDermott, Will & Emery

[57]                ABSTRACT

A disclosed floor structure of a vehicle body is provided with a floor member, a pillar member extending upward of the vehicle body from a base portion thereof with respect to the floor member, and a cross member provided in a width direction of the vehicle body on the floor member. The end portion of the cross member is attached to the base portion of the pillar member and includes a front side portion of the end portion located on a front side of the vehicle body and a rear side portion of the end portion located on a rear side of the vehicle body. Here, against a force applied from outside to inside of the vehicle body in the width direction, an attaching strength of the front side portion of the cross member to the base portion of the pillar member is higher than that of the rear side portion of the cross member to the base portion of the pillar member.

14 Claims, 4 Drawing Sheets

FLOOR STRUCTURE OF VEHICLE BODY

BACKGROUND OF THE INVENTION

The present invention relates to a floor structure of a vehicle body, and, more specifically, relates to a floor structure of a vehicle body in which an end portion of a cross member extending on a floor portion in the width direction of the vehicle body is connected to a base portion of a center pillar.

Japanese Utility Model Registration Application Laid-Open No. H5-28790 has disclosed a floor structure of a vehicle body in which an attaching flange provided vertically at an end portion of a cross member extending in the width direction of the vehicle body is joined to a vertical face of a side sill located at a base portion of a center pillar in the center portion with respect to the forward/backward direction of the vehicle body.

However, in such a floor structure of the vehicle in which the attaching flange of the cross member is joined to the vertical face of the side sill located at the base portion of the center pillar, when an external force like an impact force is applied to the center portion of the vehicle body at the time of a collision or the like on the side thereof, each panel member constituting the base portion of the center pillar is likely to be deformed.

As a countermeasure, it is possible to just increase the thickness of each panel member constituting the base portion of the center pillar, additionally provide a portion on which a stress is concentrated with a stiffener member, increase the sectional area of a box structure of the base portion or the like. However, these measures lead to increased weight and cost, enlargement of occupied area, increased difficulty in welding work in mass production or the like and therefore they are not desirable.

That is, a proposal of a structure based on a novel design concept, that is capable of, when an external force is applied sideways to the base portion of the center pillar, namely when a collision energy is applied sideways, absorbing the external force without increases of weight and cost, which is compact and which is suitable for mass production, has been much demanded.

SUMMARY OF THE INVENTION

Accordingly, an object of the present invention is to provide a floor structure of a vehicle body which is capable of absorbing a collision energy effectively and highly reliably without any increase in weight and cost.

To achieve the above object, according to an aspect of the present invention, there is provided a floor structure of a vehicle body, comprising a floor member, a pillar member extending upward of the vehicle body from a base portion thereof with respect to the floor member, and a cross member provided in a width direction of the vehicle body on the floor member. The end portion of the cross member is attached to the base portion of the pillar member and includes a front side end portion located on a front side of the vehicle body and a rear side end portion located on a rear side of the vehicle body. Here, against a force applied from outside to inside of the vehicle body in the width direction, an attaching strength of the front side end portion of the cross member to the base portion of the pillar member is higher than that of the rear side end portion of the cross member to the base portion of the pillar member.

In other words, from another aspect of the present invention, there is provided a floor structure of a vehicle body, comprising a floor member, a pillar member extending upward of the vehicle body from a base portion thereof with respect to the floor member; and rotating means rotating the base portion of the pillar member around an axis of the pillar member by using a force applied from outside to inside of the vehicle body with respect to the width direction of the vehicle body.

DETAILED DESCRIPTION OF THE PREFERRED EMBODIMENT

Figure 1:
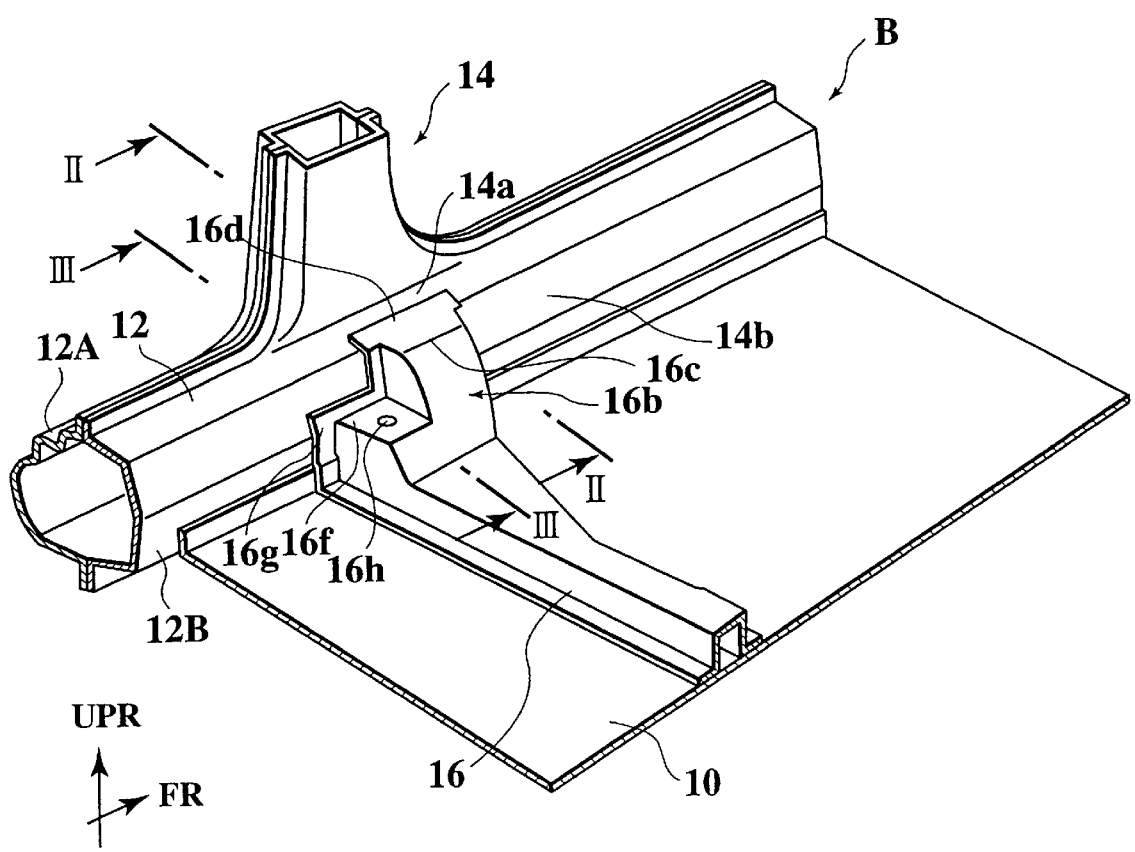
FIG. 1 is a perspective View of major parts of a floor structure of a vehicle body according to an embodiment of the present invention.

Hereinafter, an embodiment of the present invention will be described in detail with reference to the accompanying drawings.

In FIGS. 1 to 6, FR indicates the forward direction of a vehicle body B and UPR indicates the upward direction thereof. Reference numeral 10 denotes a floor panel of the vehicle body B, and a side sill 12 (only its one side is shown in the Figures, since the right and left sides are symmetrical) comprising a outer side 12A and inner side 12B is disposed on each of both right and left end portions of the floor panel 10 so as to extend in the forward/backward length direction of the vehicle body B. A outer center pillar 13A and a inner center pillar 13B are joined to a portion extended upward from a center portion of the side sill 12 extending in the forward/backward direction of the vehicle body B so as to construct a center pillar 14 extending in the upward/downward direction of the vehicle body B.

A cross member 16 is disposed on top of a floor panel 10 so as to extend in the width direction of the vehicle body B and an end portion 16a of the cross member 16 is joined to a tunnel portion 10a extending at a center portion of the floor panel 10 with respect to the width direction of the vehicle body B and along the forward/backward direction of the vehicle body B, and the other end 16b of the cross member 16 is joined to the center portion of the side sill 12 with respect to the forward/backward direction of the vehicle body B corresponding to the base portion of the center pillar 14 (i.e., the portion at which the center pillar 14 joins the side sill 12).

In the other end portion 16b of the cross member 16, a front side portion 16c thereof is higher than a rear side portion 16f thereof. An attaching flange 16d extending horizontally, that is, in parallel to a plane defined by the width direction and the forward/backward direction of the vehicle body B, is formed on a top face of the front side portion 16c and joined correspondingly to a horizontal face 14a formed on the base portion of the center pillar 14. On the other hand, an attaching flange 16g extending along the upward direction of the vehicle body B, that is, extending vertically is provided to the rear side portion 16f and joined correspondingly to a vertical wall 14b of the base portion of the center pillar 14. In this manner, only the top face of the front side portion 16c is raised up to the height of the horizontal face 14a of the center pillar 14 so as to support the center pillar 14 at this higher position. Additionally, the attaching flange 16d of the front side portion 16c is joined to the horizontal face 14a of the center pillar 14, so that the front side portion 16c forming the horizontal joint portion at the higher position receives an input F in its shearing direction. As a result, the attaching strength of the front side portion 16c is higher than that of the rear side portion 16f.

An attaching hole 16h is formed in a top face of the rear side portion 16f which is lower than the top face of the front side portion 16c of the end portion 16b. An end of a seat rail bracket 18 is attached to this attaching hole 16h by means of a bolt and nut. The seat rail bracket 18 extends from the end portion 16b of the cross member 16 inwardly along the width direction of the vehicle body B, and a seat rail 20 on which a seat 26 is to be attached is installed on the other end of a seat rail bracket 18. The seat rail 20 extends in the forward/backward directions of the vehicle body B and is directly attached on a second cross member 24. The seat rail 20, of course, is attached thereon through other seat rail bracket. A seat rail 21 making a pair with the seat rail 20 is attached along the side of the tunnel portion 10a and between the cross member 16 and second cross member 24. Both end portions of each of the seat frames 22 are fixed between seat rail 20 and seat rail 21. The position of rear one of the seat frames 22 in the back and forth direction of the vehicle body B is substantially coincident with the position of the front side portion 16c of the end portion 16b of the cross member 16 in the forward/backward direction of the vehicle body B.

In the floor structure of the vehicle body according to this embodiment stated above, when a collision on the side of the vehicle body B occurs, a closed section defined by the cross member 16 and the vertical wall 14b of the center pillar 14 is crushed at the end portion 16b of the cross member 16 in the base portion of the center pillar 14. Since the attaching flange 16d of the front side portion 16c of the cross member 16 is joined to the horizontal face 14a of the center pillar 14 so that the force input sideways is received in the shearing direction of such a joint portion between the attaching flange 16d and the horizontal face 14a, a sufficient reaction force can be generated.

Figure 6:
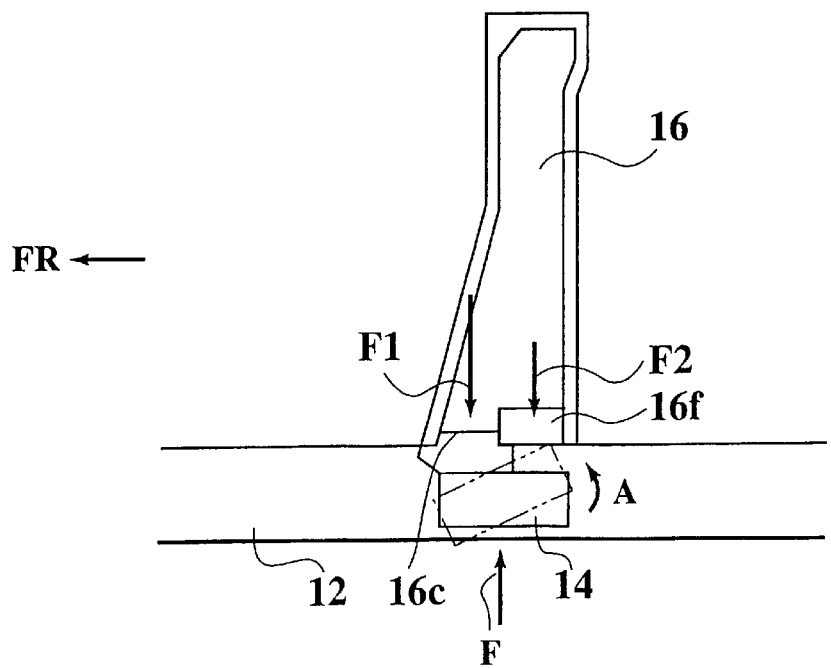
FIG. 6 is a plan view for explaining an operation of the floor structure of the vehicle body according to the embodiment.

Further, since only the attaching flange 16d of the front side portion 16c is joined to the horizontal face 14a and also the front side portion 16c is joined to the base portion of the center pillar 14 at a position higher than the rear side portion 16f, the attaching strength of the front side portion 16c to the base portion of the center pillar 14 is set to be higher than that of the rear side portion 16f. Thus, as shown in FIG. 6, the reaction force F1 of the front side portion 16c against the input force F applied sideways toward the center pillar 14 is larger than the reaction force F2 of the rear side portion 16f. As a result, as shown by an arrow A, the center pillar 14 is twisted such that the rear side portion 16f, which is far side relative to a passenger sitting on the front seat 26 which is slightly forward of the center pillar 14, is rotated around the front side portion 16c. As a result, the collision energy can be absorbed effectively and safely by such a twisting deformation of the center pillar 14.

Figure 2:
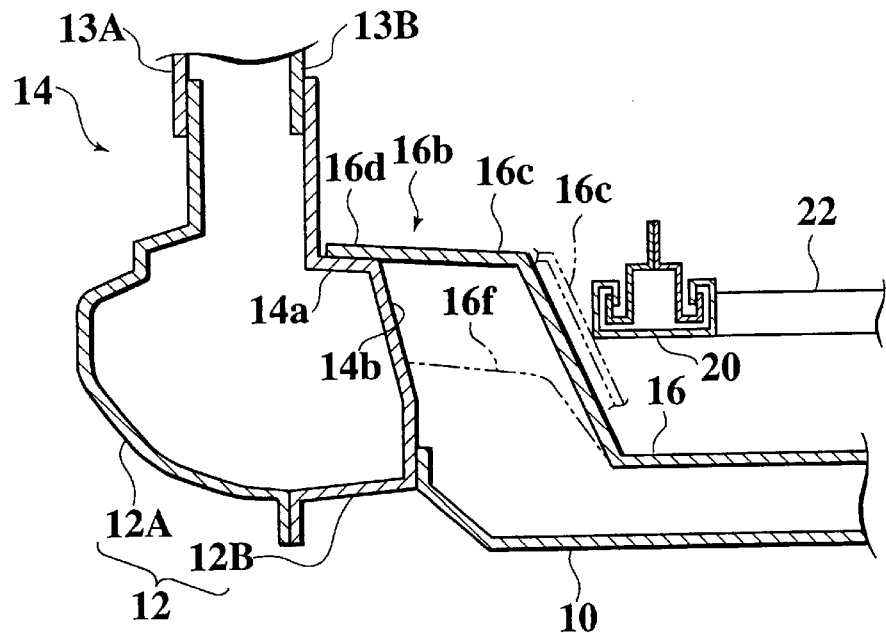
FIG. 2 is a sectional view taken along the line II—II of FIG. 1 according to the embodiment.
Figure 3:
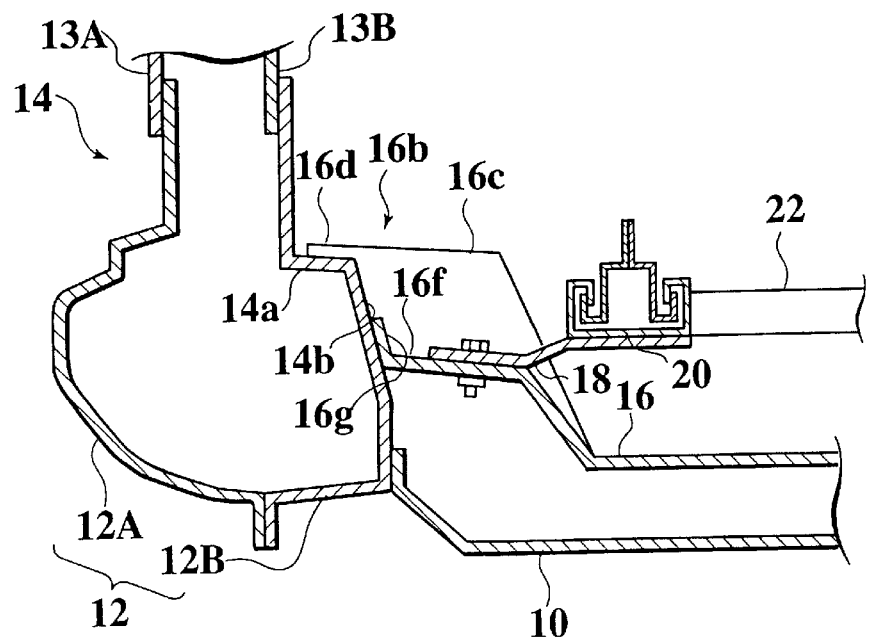
FIG. 3 is a sectional view taken along the line III—III of FIG. 1 according to the embodiment.
Figure 4:
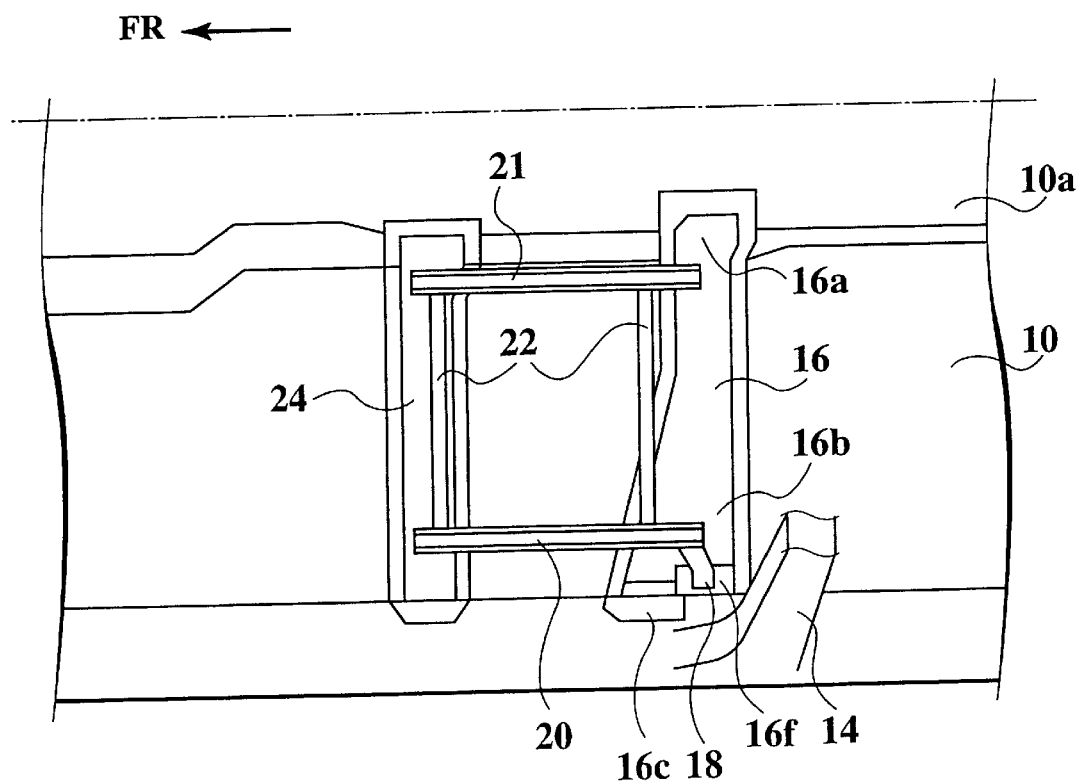
FIG. 4 is a plan view of major parts of the floor structure of the vehicle body according to the embodiment.
Figure 5:
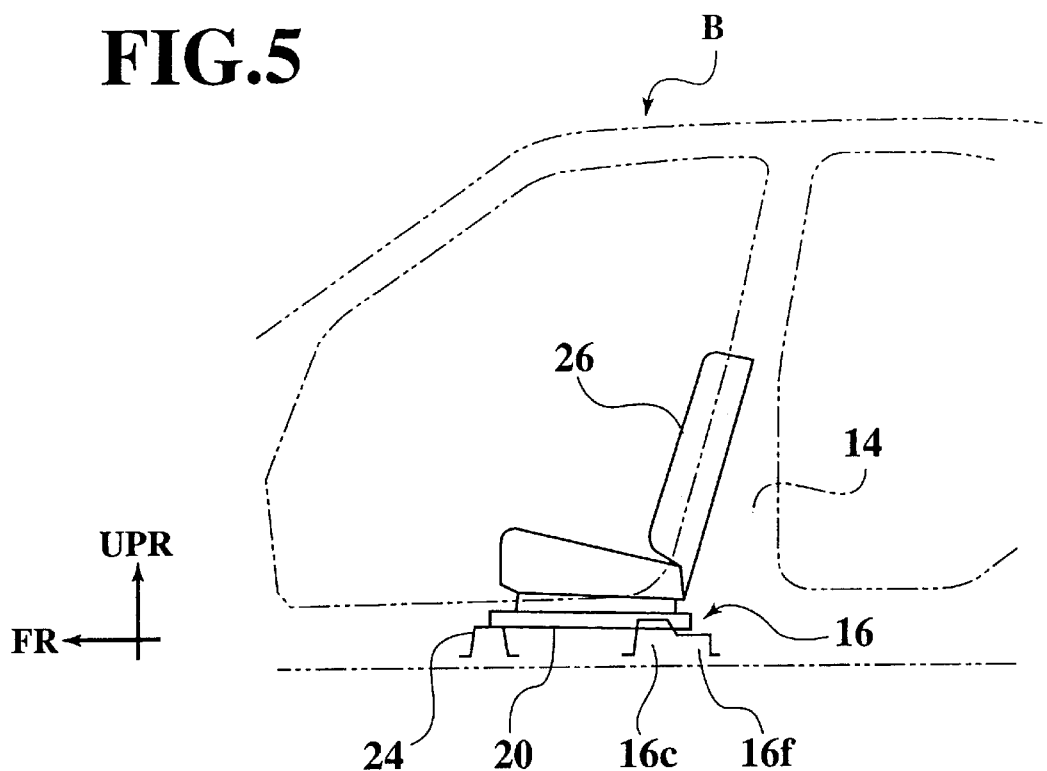
FIG. 5 is a side view of major parts of the floor structure of the vehicle body according to the embodiment.

If the deformation progresses further so that the base portion of the center pillar 14 begins to invade into the vehicle body B, as shown in FIG. 2, the front side portion 16c of the end portion 16b of the cross member 16 reaches a position of the phantom line so that the front side portion 16c interferes with the seat rail 20. Thus, the invasion of the root portion of the center pillar invasion into the vehicle body B is prevented. In detail, the seat frame 22 fixed on the seat rail 20 acts as an effective preventing member, to prevent the front side portion 16c from invading further. This is because the seat frame 22 is a high strength member that is capable of generating a sufficient reaction force. As a result, the strength of the side portion of the vehicle body B, particularly, that of the base portion of the center pillar 14 is significantly improved, thereby making it possible to improve energy absorbing performance at the time of collision or the like.

In the above embodiment, the center pillar 14 corresponds to a so-called B pillar. Although it is assumed that the center pillar is provided in the center portion of the vehicle body B in the above description, it may be displaced in the forward/backward direction of the vehicle body B for the reason of vehicle body design or the like.

Further, although it is assumed that the attaching flange 16d of the cross member 16 and the horizontal face 14a of the corresponding center pillar 14 are horizontal planes in the above description, they may be inclined in a range permissible in view of their functions with respect to an input force, weldability or the like.

In the above embodiment, a setting amount by which the front side portion 16c of the cross member 16 is set higher relative to the rear side portion 16f may be determined depending on a difference of required attaching strengths by considering a magnitude of an estimated input force, positions thereof, strength of the cross member 16 or the like. Of course, the structure for providing with a difference of the strength between the front side portion 16c and rear side portion 16f of the cross member 16 is not restricted to this structure.

The entire contents of a Patent Application No. TOKUGANHEI 10-95938, with a filing date of Apr. 8, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A floor structure of a vehicle body, comprising;
   a floor member;
   a side sill provided at a side end portion of the floor member;
   a pillar member extending upward from a center portion of the side sill with respect to the floor member;
   a cross member provided in a width direction on the floor member, an end portion of the cross member being attached to the center portion of the side sill and having a front side portion located on a front side and a rear side portion located on a rear side;
   a seat rail provided inside the front side portion of the end portion of the cross member with respect to the width direction; and
   a bracket member connected to a top portion of the rear side portion of the end portion of the cross member, wherein a rear portion of the seat rail is attached to the bracket member;
   wherein, when a force is applied from outside of the vehicle body in the width direction, an attachment strength of the front side portion of the cross member to the center portion of the side sill is higher than that of the rear side portion of the end portion of the cross member to the center portion of the side sill.

2. A floor structure of a vehicle body, comprising:

a floor member;

a side sill provided at a side end portion of the floor member;

a pillar member extending upward from a center portion of the side sill with respect to the floor member;

a cross member provided in a width direction on the floor member, an end portion of the cross member being attached to the center portion of the side sill and having a front side portion located on a front side and a rear side portion located on a rear side; and a seat rail provided inside the front side portion of the end portion of the cross member with respect to the width direction;

wherein, when a force is applied from outside of the vehicle body in the width direction, an attachment strength of the front side portion of the cross member to the center portion of the side sill is higher than that of the rear side portion of the end portion of the cross member to the center portion of the side sill, wherein the seat rail is provided so as to be one of a pair of seat rails opposing each other in the width direction of the vehicle body, the pair of seat rails being connected by a frame member in the forward/backward direction of the vehicle body being coincident with that of the front side portion of the end portion of the cross member in a length direction.

3. A floor structure of a vehicle body, comprising:

a floor member;

a side sill provided at a side end portion of the floor member;

a pillar member extending upward from a center portion of the side sill with respect to the floor member; and a cross member provided in a width direction on the floor member, an end portion of the cross member being attached to the center portion of the side sill and having a front side portion located on a front side and a rear side portion located on a rear side, wherein, when a force is applied from outside of the vehicle body in the width direction, an attachment strength of the front side portion of the cross member to the center portion of the side sill is higher than that of the rear side portion of the end portion of the cross member to the center portion of the side sill, and wherein an upper portion of the front side portion of the end portion of the cross member is higher than that of the rear side portion of the end portion of the cross member.

4. A floor structure of a vehicle body according to claim 3, further comprising a seat rail provided inside the front side portion of the end portion of the cross member with respect to the width direction.

5. A floor structure of a vehicle body according to claim 3, further comprising a flange portion, extending in a horizontal direction and provided on the front portion of the end portion of the cross member, joined to a horizontal face provided on the pillar member.

6. A floor structure of a vehicle body according to claim 3, wherein the pillar member is a center pillar.

7. A floor structure of a vehicle body, comprising:

a floor panel;

a side sill connected to a side of the floor panel;

a pillar extending upward from a center portion of the side sill, the center portion being substantially at a central position in a length direction of the vehicle body; and a cross member having an end portion and an other end portion, the cross member being mounted at its other end portion to the side sill where the pillar extends from the side sill, the other end portion having a front side portion and a rear side portion, wherein, when a force is applied laterally to the vehicle body, a reaction force generated at the front side portion of the other end portion of the cross member is larger than a reaction force generated at the rear side portion of the other end portion of the cross member, wherein the front side portion of the other end portion of the cross member is joined to the side sill at a position that is higher than that at which the rear side portion of the other end portion of the cross member is joined to the side sill.

8. A floor structure of a vehicle body according to claim 7, wherein the pillar has a horizontal face and the front side portion of the other end portion of the cross member has a flange portion that extends in a horizontal direction and that is joined to the horizontal face of the pillar.

9. A floor structure of a vehicle body according to claim 7, further comprising a seat rail extending in the length direction provided inside the front side portion of the other end portion of the cross member with respect to the width direction of the vehicle body.

10. A floor structure of a vehicle body according to claim 7, further comprising a pair of seat rails extending in a lengthwise direction, one of the seat rails being mounted at one end to the end portion of the cross member and the other seat rail being mounted to the other end of the cross member.

11. A floor structure of a vehicle body according to claim 10, wherein a rear end portion of the other seat rail is connected to the rear side portion of the other end portion of the cross member.

12. A floor structure of a vehicle body according to claim 10, wherein the pillar is a center pillar and the pair of seat rails are adapted to secure a front seat.

13. A floor structure of a vehicle body according to claim 10, further comprising a pair of seat frames fixed to and between the pair of seat rails.

14. A floor structure of a vehicle body according to claim 13, wherein one of the pair of seat frames is connected to the other seat rail at approximately a same position in the lengthwise direction as the front side portion of the other end portion of the cross member.

* * * * *